(No Model.) 2 Sheets—Sheet 1.

J. G. BAKER.
DRIVING MECHANISM FOR MEAT CUTTING MACHINES.

No. 303,482. Patented Aug. 12, 1884.

WITNESSES:
Harry L. Ashenfelter
James F. Tobin

INVENTOR:
John G. Baker
by his Attorneys
Howson & Son

N. PETERS, Photo-Lithographer, Washington, D. C.

(No Model.) 2 Sheets—Sheet 2.

J. G. BAKER.
DRIVING MECHANISM FOR MEAT CUTTING MACHINES.

No. 303,482. Patented Aug. 12, 1884.

WITNESSES:
Harry L. Ashenfelter
James F. Tobin

INVENTOR:
John G. Baker
by his Attorneys
Howson & Sons

UNITED STATES PATENT OFFICE.

JOHN G. BAKER, OF PHILADELPHIA, PENNSYLVANIA, ASSIGNOR TO THE ENTERPRISE MANUFACTURING COMPANY, OF SAME PLACE.

DRIVING MECHANISM FOR MEAT-CUTTING MACHINES.

SPECIFICATION forming part of Letters Patent No. 303,482, dated August 12, 1884.

Application filed July 2, 1883. (No model.)

*To all whom it may concern:*

Be it known that I, JOHN G. BAKER, a citizen of the United States, and a resident of Philadelphia, Pennsylvania, have invented certain Improvements in Driving Mechanism for Meat-Cutting Machines, of which the following is a specification.

My invention consists of mechanism, fully described hereinafter, for driving the screw and knife or knives of meat-cutting machines, and especially of the meat-cutting machine for which Letters Patent No. 271,398 were granted to my assignees January 30, 1883, the main object of my invention being to so construct the said driving mechanism as to permit the ready removal from the outer casing of those parts of the meat-cutting machine which have to be frequently cleansed, this removal being effected without disturbing the driving mechanism.

Figure 1:
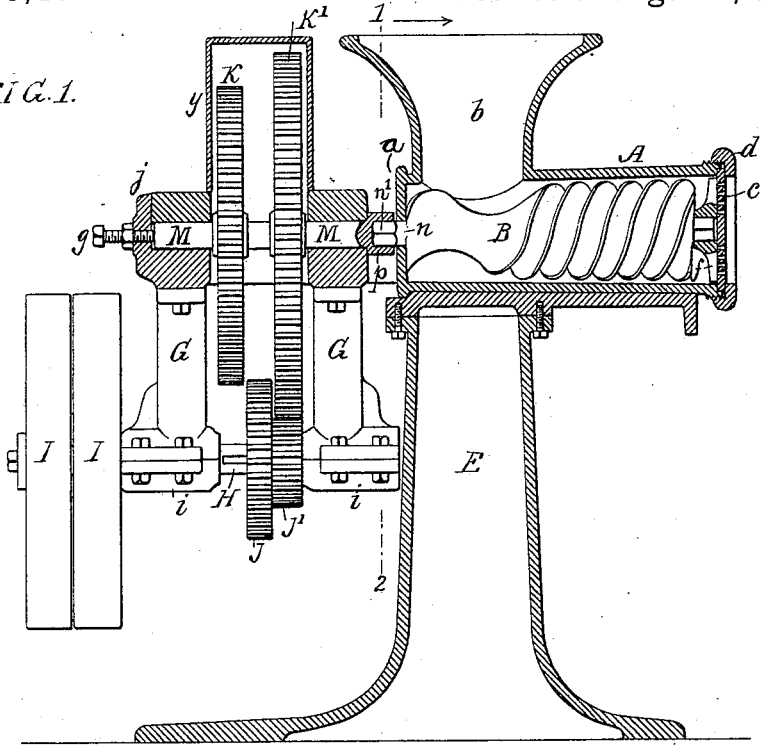
Figure 2:
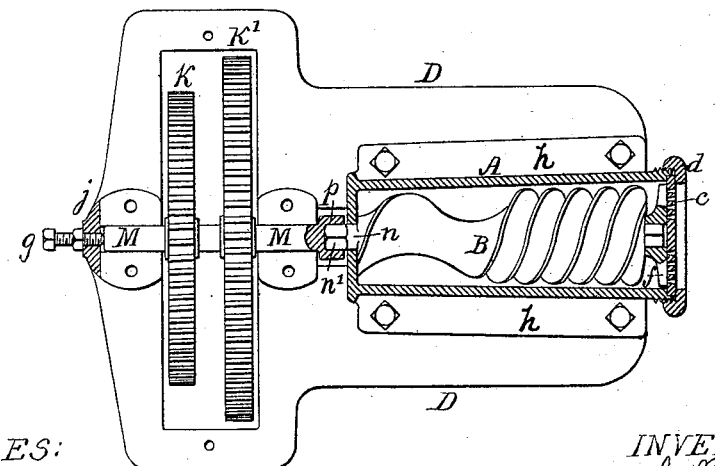
Figure 3:
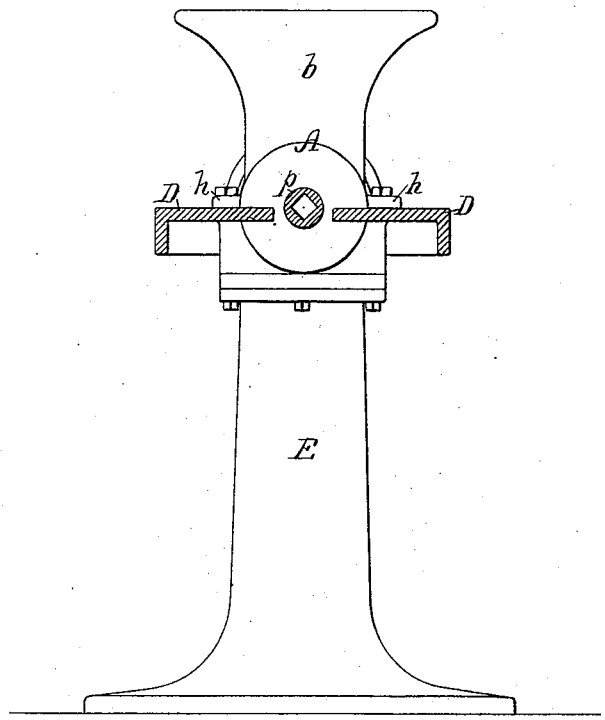
Figure 4:
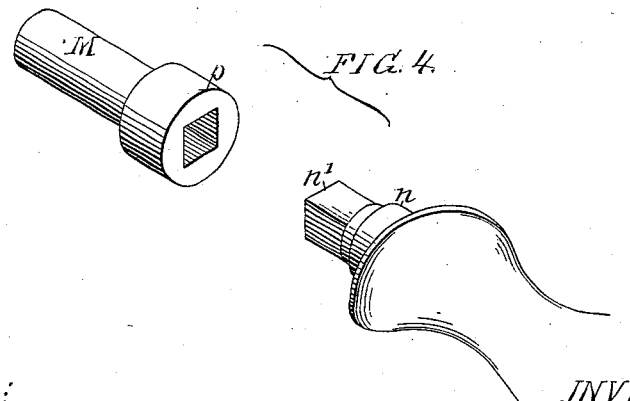

In the accompanying drawings, Figure 1, Sheet 1, is a side view, partly in section, of a meat-cutting machine with my improved driving mechanism; Fig. 2, a plan view, partly in section; Fig. 3, Sheet 2, a vertical section on the line 1 2, Fig. 1; and Fig. 4, a perspective view illustrating part of my invention.

The meat-cutting machine for which the improved driving mechanism is mainly intended formed the subject of the aforesaid patent, and hence the following brief description of it will suffice here.

The machine consists of a hollow casing, A, provided near its closed rear end, $a$, with a hopper, $b$, and at its outer end with a perforated plate, $c$, confined to its place by a screw-ring, $d$. The meat introduced into the hopper is brought under the influence of a screw, B, and is forced by the latter against the perforated plate $c$, in contact with which is a cutter, $f$, carried by and arranged to rotate with the said screw B, this cutter, which has a number of radial blades, severing from the mass of meat such portions as are forced by the screw into the perforations of the plate $c$, so that as the rotation of the screw is continued the entire mass of meat will be cut into fragments, which will fall from the exterior of the perforated plate into any suitable receptacle.

The screws and interior of the casings of these machines have frequently to be cleansed; hence it is important that facilities should be afforded for the ready removal of the screw B. When the machines are small enough to be driven by hand, there is no difficulty in providing facilities for this purpose. My present invention, however, is to afford the same facilities for removing the said parts from power-driven machines without disturbing the driving mechanism.

A plate, D, of the character best observed in Fig. 2, is secured to the top of a suitable standard, E, and this plate carries both the driving appliances and the meat-cutting machine, the casing A of the latter having flanges $h\ h$, which are bolted to the said plate, to the under side of which are secured hangers G G, having at their lower ends bearings $i$ for the driving-shaft H, which is provided with the usual fast and loose pulleys, I I, for receiving a driving-belt, and with two pinions, J J', of different diameters, the former being arranged to gear into a wheel, K, on the counter-shaft M, and the pinion J' being arranged to gear into the larger wheel K' on the same counter-shaft; but when one pinion is in gear the other is always out of gear.

The pinions may be cast together, and are in any case adjustable on the driving-shaft H, so that either the small pinion may gear into the large wheel K', or the larger pinion into the smaller wheel K.

It may be stated here that this duplex system of driving-wheels is not essential to my invention; but, as the material operated on by the machine differs in consistency, it may be advisable to drive the screw B faster and with less power in some cases than in others; hence the gearing described is preferred.

The gear-wheels may be dispensed with, and a driving-pulley of large diameter for receiving a driving-belt might be secured directly to the shaft M—an arrangement, however, which might be inconvenient. The counter-shaft M is in line with the axis of the screw B, the journal $n$ of which turns in the closed end $a$ of the casing A, projects beyond the same, and is detachably coupled to the said counter-shaft M, this coupling consisting, in the present instance, of a socket, p, on the shaft, for the reception of the square end n' of the journal n of the screw, as best observed in Fig. 4; but any other coupling may be adopted which will permit the disconnection of the journal of the screw from and its connection to the counter-shaft by an endwise movement of the screw, so that after the screw-ring d and perforated plate c have been detached from the casing A the screw and its knife f may be withdrawn from the said casing without interfering with the driving appliances.

It will be noted that a set-screw, g, passing through a projection, j, on the plate D, bears against the end of the counter-shaft, M, which is permitted to have a slight play in its bearings. The object of this is to accurately adjust the rotating knife f, when worn, to the inner face of the perforated plate c, for, in order to produce the desired severing effect on the meat, the knife should always be in contact with the plate, but should not be forced so tightly against the same as to produce undue friction.

I have referred to my improved driving mechanism as applied to the aforesaid patented meat-cutter; but it may be combined with any meat-cutting or sausage-filling machine in which a screw, either continuous or in sections, revolves in an outer casing.

I claim as my invention—

1. The combination of the fixed casing A, its detachable perforated plate, and the screw B, removable from the said casing through the front end of the same, and having a journal passing through and having its bearing in the rear end of the casing, with a shaft, M, outside the casing, and adapted to bearings in the same frame which carries the casing, and with a coupling which permits the ready connection of the journal of the screw to and its disconnection from the said shaft, all substantially as set forth.

2. The combination of the casing A, its perforated plate c, the screw B, and its rotating knife f, with a driving-shaft, M, coupled to the journal of the screw, and with a set-screw, g, for the endwise adjustment of the shaft, the screw, and its knife, substantially as set forth.

In testimony whereof I have signed my name to this specification in the presence of two subscribing witnesses.

JOHN G. BAKER.

Witnesses:
HARRY L. ASHENFELTER,
HARRY SMITH.